Sept. 17, 1946.  E. S. COOK  2,407,870
VARIABLE LOAD BRAKE APPARATUS
Filed Dec. 28, 1944
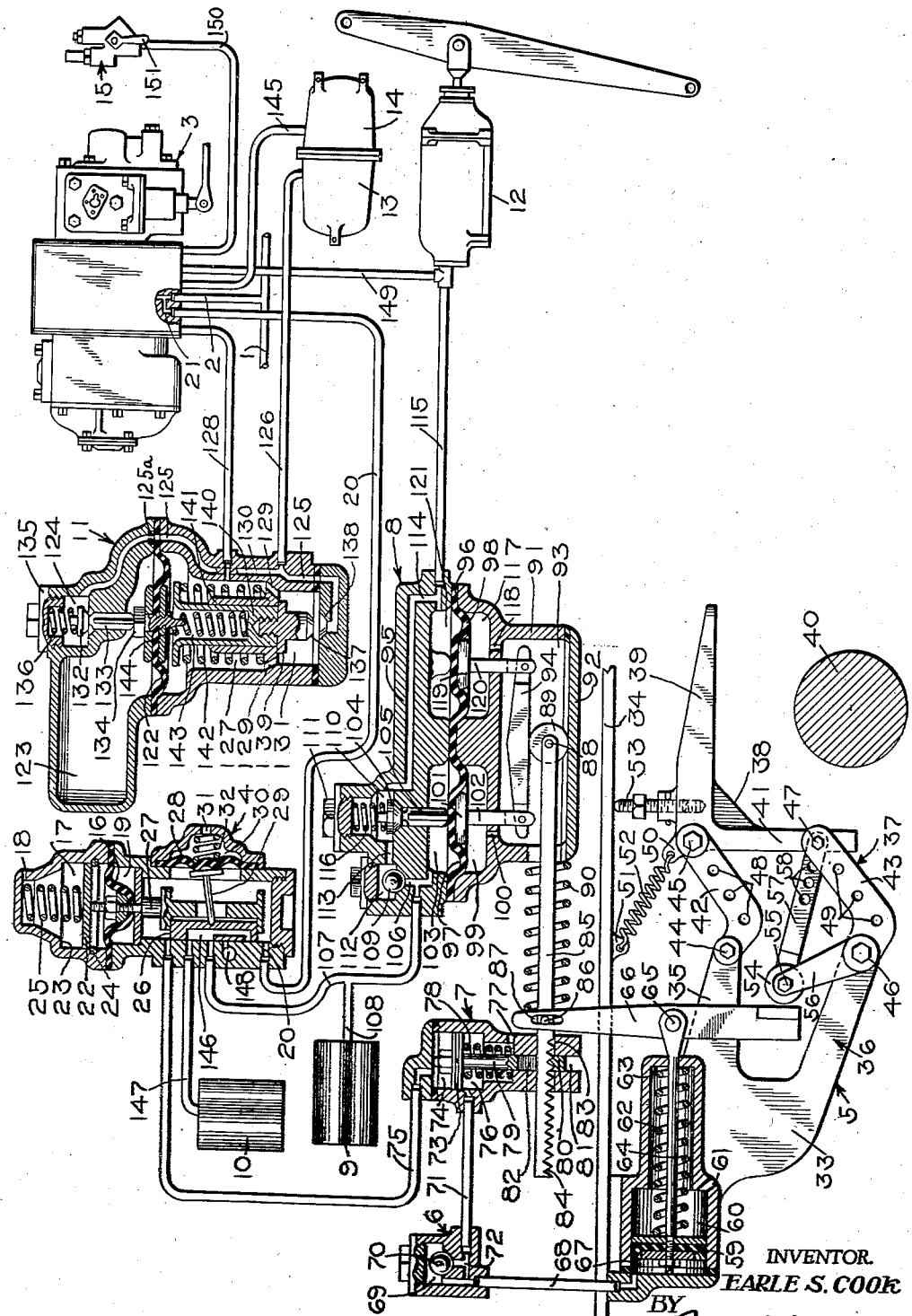
INVENTOR.
EARLE S. COOK
BY
*A. M. Higgins*
ATTORNEY Patented Sept. 17, 1946

2,407,870

UNITED STATES PATENT OFFICE 2,407,870

VARIABLE LOAD BRAKE APPARATUS

Earle S. Cook, Forest Hills, Pa., assignor to The Westinghouse Air Brake Company, Wilmerding, Pa., a corporation of Pennsylvania Application December 28, 1944, Serial No. 570,053

28 Claims. (Cl. 303—22)

This invention relates to variable load brake equipment for vehicles, and more particularly to that type of equipment which is constructed and arranged to be automatically adjusted or conditioned to vary the braking force according to the position that the vehicle body, under various loads, assumes relative to a fixed part of a truck.

The present trend toward the use of light weight materials in the construction of railway freight cars has resulted in much higher ratios of gross weight to tare weight than ever before encountered. Since the braking force with relation to the weight of an empty car must be such as to avoid wheel sliding and excessive train shock, the braking force on lighter weight cars will consequently have to be lower than heretofore. Because the gross weight of the car is limited only by the load limit for the trucks, which remains unchanged, the lower braking force will be inadequate for proper control of such cars when loaded.

The principal object of this invention, therefore, is to provide a variable load brake equipment which will operate in conjunction with the present type of fluid pressure freight brake equipment so that the braking force will be sufficiently low on an empty car to prevent wheel sliding and will be increased in relation to any increase in the gross weight of the car so that a loaded or partially loaded car may be properly controlled in a train.

Another object is to provide a variable load brake equipment which will require a single standard auxiliary reservoir and a single brake cylinder device and which will operate in conjunction with the standard fluid pressure freight brake equipment to obtain the present application and release time intervals on a car without altering the flow capacities of any passages in the present standard freight brake equipment.

Another object is to provide a variable load brake equipment which will prevent the production of undesirably high braking forces on an empty or a lightly loaded vehicle by an over-reduction in brake pipe pressure and thereby provide for safer operation while at the same time conserving the fluid under pressure in the auxiliary reservoir for subsequent brake applications. As will appear later, particular importance attaches to this feature in the operation of train brakes on long descending grades.

Another object is to provide a variable load brake equipment which will always have a braking force equivalent to a full service brake application of the standard freight brake equipment available for use by the train operator.

Another object is to provide a variable load brake equipment of the type employing a single brake cylinder device in which the fluid pressure may be varied according to the degree of brake application, the pressure for any given application being proportioned according to the weight of the load carried by the vehicle.

To attain these objects the variable load brake mechanism embodying this invention employs a single brake cylinder device, which is preferably of larger diameter than the standard device, for providing the braking force for a fully loaded vehicle. The lower degree of braking force which is necessary for vehicles carrying lighter loads is obtained by the use of a relay valve mechanism of the scale beam type which is arranged to operate in response to the pressure of fluid in the brake cylinder device to spill or bleed fluid under pressure from the brake cylinder device or brake cylinder pipe into a volume reservoir until the degree of pressure of fluid in said reservoir is sufficient to balance with the brake cylinder pressure, thereby reducing the pressure of fluid in the brake cylinder device according to the weight of the lading carried by the vehicle as determined by the position of the fulcrum along the scale beam. The fulcrum is positioned, according to the weight of the load carried, by a mechanism which is responsive to fluid under pressure supplied from the brake pipe when the brake pipe is below a certain degree of pressure to initially actuate a measuring element into engagement with the top of a vehicle axle and thereafter to displace the fulcrum distances progressively increasing as the weight of the lading increases.

A feature of this variable load brake mechanism is the use of an intercepting valve device interposed in the communication between the brake controlling valve device and the auxiliary reservoir and operative to close off said communication during a brake application if the pressure of fluid in the auxiliary reservoir is reduced more than a fixed amount, such as twenty pounds, below that at the initiation of the brake application. Upon release of the brakes the intercepting valve device will reset to measure the fixed amount of twenty pounds reduction in fluid pressure from the pressure to which the auxiliary reservoir has been recharged, and upon a further reduction of twenty pounds will again close off the communication.

Other objects and advantages will appear in the following more detailed description of the invention.

In the accompanying drawing the single figure is a diagrammatic view mainly in section of a variable load brake equipment embodying the invention.

As shown in the drawing, the variable load fluid pressure brake equipment may comprise the usual brake pipe 1, a branch pipe 2, a brake controlling valve device 3, a cut-off valve device 4, a load measuring apparatus 5, a check valve device 6, a locking mechanism 7, a variable load valve mechanism 8, a service volume reservoir 9, an emergency volume reservoir 10, an intercepting valve device 11, a brake cylinder device 12, an auxiliary reservoir 13, an emergency reservoir 14, and a retaining valve device 15.

The brake controlling valve device 3 shown is of the "AB" type but may be of any other desired type. This device may be of substantially the same construction and have the same operating characteristics as the "AB" valve device fully described in the patent to Clyde C. Farmer, No. 2,031,213, issued February 18, 1936, and assigned to the assignee of the present invention, and in view of this it is deemed unnecessary to show and describe this device in detail. It will, of course, be understood that this device operates upon a service reduction in brake pipe pressure to supply fluid under pressure to effect a service application of the brakes, upon an emergency reduction in brake pipe pressure to effect an emergency application of the brakes, and upon an increase in brake pipe pressure to effect a release of the brakes and the charging of the brake equipment.

The cut-off valve device 4 may comprise a casing in which there is mounted a flexible diaphragm 16, at one side of which is a chamber 17 in constant open communication with the atmosphere by way of a passage 18. At the other side of the diaphragm is a valve chamber 19 which is in constant open communication by way of a connected pipe and passage 20 with a brake pipe passage 21 provided in the brake controlling valve device 3. Slidably mounted in chamber 17 is a stop member 22 which is arranged to abut either a shoulder 23 formed on the wall of the chamber to limit the upward movement of the member, or a ring 24, expanded into an annular groove in said wall, to limit the downward movement of said member. Interposed between and operatively engaging the member 22 and the top wall of the chamber 17 is a spring 25 which, at all times, tends to move the stop member downwardly. Contained in the chamber 19 is a slide valve 26 which is arranged to be operated by a notched stem or follower 27 operatively secured to the flexible diaphragm 16 for controlling the operation of the locking mechanism 7 and the load measuring apparatus 5, and for also controlling a communication to the emergency volume reservoir 10, as will hereinafter more fully appear.

The cut-off valve device 4 is provided with a loading mechanism for the purpose of preventing fluid under pressure, acting on the under side of the slide valve 26, from raising the valve from its seat when the pressure of fluid in the valve chamber 19 is reduced. This mechanism may comprise a flexible diaphragm 28 which is mounted in the cut-off valve device casing and which operatively engages a rocking pin 29 through which a loading force is adapted to be transmitted to the slide valve 26. The valve chamber 19 is open to the under side of the diaphragm and at the other side of the diaphragm there is a chamber 30 which is in constant open communication with the atmosphere by way of a passage 31. Contained in the chamber 30 and interposed between and engaging the valve casing and the diaphragm 28 is a spring 32 which produces the loading force to hold the slide valve 26 on its seat.

The load measuring apparatus 5 may be of any desired construction but for illustrative purposes is shown as comprising a bracket 33 which is rigidly secured by any suitable means to any convenient part of the vehicle body such for instance as to the lower cover plate of a center sill 34 of which only the bottom cover plate is shown. The bracket includes the arms 35 and 36 on which are operatively mounted a linkage or measuring mechanism 37 comprising a measuring element 38 having a horizontal portion 39, disposed above the central portion of an axle 40 and parallel to the bottom of the center sill 34, and having a downwardly depending portion 41 which is normally spaced away from the axle a sufficient distance so that it will not be engaged by the axle 40 when the vehicle is subject to the usual service shocks. Extending between the arms 35 and 36 and the measuring element 38 and operatively connected thereto are vertically spaced links 42 and 43, link 42 having one end pivotally connected by means of a pin 44 to the arm 35 and having the other end connected by means of a pin 45 to the upper end of the portion 41 of the measuring element 38. One end of the link 43 is pivotally connected by means of a pin 46 to the arm 36 and the other end is connected by means of a pin 47 to the lower end of the depending portion 41 of the measuring element. The axes of the pivot points at each end of the links 42 and 43 are in vertical alignment and spaced apart equal distances vertically so as to maintain the portion 39 substantially parallel with the center sill 34 in all positions of the linkage. The links 42 and 43 are each provided with a series of corresponding holes 48 and 49, respectively, for receiving the pins 45 and 47, respectively, to obtain a different degree of total vertical travel of the measuring element 38 to meet varied conditions, as set forth in the copending patent application of Claude A. Nelson et al., Serial No. 551,200, filed August 25, 1944, now Patent No. 2,402,434, issued June 18, 1946, and assigned to the assignee of the present application, in which the load measuring mechanism 5 is fully disclosed and claimed. Operatively connected between a lug 50 on the element 38 and a lug 51 on the center sill 34 is a tension spring 52 which, at all times, tends to move the measuring element toward the position in which it is shown and to normally hold the element in this position against accidental movement therefrom. For limiting the upward travel of the element 38, the horizontal portion is provided with a stop member 53 which engages the bottom of center sill 34 and is adjustable in the portion 39 by screw-thread means. A roller 54 is mounted by means of a pin 55 on one end of a supporting member 56, which member is pivotally mounted at its other end to the arm 36 by means of the pin 46. For imparting movement to the element 38, the roller is coupled to the lower end of the portion 41 by means of a strut member 57 which is mounted at its one end on the pin 55 and at its other end on the other pin 47. The strut member is provided at the latter end with a series of holes 58 for adjusting the coupling between the roller 54 and the element 38 when a change is made in the location of the pin 47 in the link 43.

For actuating the roller 54, the load measuring apparatus 5 is a fluid pressure controlled mechanism comprising a casing which is integral with the bracket 33 and which is provided with a piston 59 having at one side a chamber 60 which is in constant open communication with the atmosphere by way of a passage 61, which chamber contains a spring 62 engaging a wall 63 of the chamber 60 and the non-pressure side of the piston 59 so as to tend to move the piston toward the position in which it is shown. A stem 64 of the piston 59 extends through chamber 60 and an opening in the wall 63 and is pivotally connected, by means of a pin 65 with a shiftable lever 66 at a point intermediate the ends of the lever. For purposes which will more fully appear later, this lever 66 is located so that its lower end may be actuated into operative engagement with roller 54.

At the other side of the piston 59 is a chamber 67 which is in constant open communication, by way of pipe and passages 68, with a valve chamber 69 of the check valve device 6. This chamber 69 contains a ball check valve 70, the under side of which is connected to a locking mechanism 7 by way of pipe and passages 71. The check valve device 6 is further provided with a passage 72 which by-passes the ball check valve and is of small flow capacity to insure the occurrence of the locking operation of the mechanism 7 before the chamber 67 is depleted of fluid under pressure, as will hereinafter more fully appear.

The locking mechanism 7 comprises a casing which is provided with a piston 73 having at one side a chamber 74 which is in constant open communication with the cut-off valve device 4 by way of a connected pipe and passage 75. At the other side of the piston is a chamber 76 which is in constant open communication with the atmosphere by way of a passage 77. This chamber 76 contains a spring 78 which operatively engages the bottom surface of the chamber and the piston 73 so as to tend to move the piston toward the position in which it is shown. A stem 79 attached to the piston 73 extends downwardly through the chamber 76 and terminates in a locking portion 80 which is slidably mounted in a guide opening 81 formed in the bottom portion of the casing of the mechanism. The locking portion 80 of the piston stem has a transverse opening 82 which is arranged to register with openings 83 formed in the wall of the opening 81. The upper surface of the bottom wall of the opening 82 in the locking portion 80 is toothed for locking engagement with a correspondingly toothed portion 84 formed on one end of a fulcrum positioning bar 85, the opening 82 being large enough to provide sufficient clearance for moving the locking portion 80 of the stem 79 downwardly out of engagement with the bar.

Intermediate its ends, the bar 85 is operably connected to the lever 66 by means of a pin 86 which extends through a slot 87 formed in the upper end of the lever 66, the slot providing for the necessary relative movement between the lever and the bar when they are operated. Rotatably connected to the right-hand end of the bar 85 by means of a pin 88 is a fulcrum member 89 which may be shifted in the variable load valve mechanism 8 in a manner to be more fully described later. Encircling the bar 85 is a helical spring 90 which engages a casing 91 of the mechanism 8 at one end and the lever 66 at the other end so as to urge the lever and thereby the bar 85, and fulcrum member 89 of the mechanism 8 toward the position in which they are shown.

The variable load valve mechanism 8 may comprise the casing 91 having a recess formed therein and having secured to the bottom thereof in any suitable manner a cap portion 92 which closes the open end of said recess, the inner surfaces of the recess and the cap portion defining a chamber 93 which is constantly open at the left-hand end to the atmosphere. This chamber contains the fulcrum member 89 and a scale beam lever 94 arranged to rock on the fulcrum member. Secured in any suitable manner to the top of the casing 91 is a cap portion 95, there being a sealing gasket 96 clamped between the casing 91 and the cap portion. This gasket 96 comprises laterally spaced flexible diaphragms 97 and 98 which are preferably of substantially the same area.

At one side of the diaphragm 97 there is a chamber 99 which is open at all times to the atmosphere by way of an opening 100 and the atmospheric chamber 93 in the casing 91. Contained in this chamber 99 and operatively engaged by the diaphragm 97 is a follower 101 having a stem 102 which extends through an opening in the casing, and which, at its lower end, is pivotally connected with the scale beam lever 94 at a point located a short distance from its left-hand end. At the other side of the diaphragm 97 is a chamber 103 which is open to the under side of a valve 104 by way of a fluted stem 105 of the valve, which stem extends into chamber 103 and is arranged to be engaged by the diaphragm 97 so that the valve may be operated to control the flow of fluid under pressure to said chamber, whence it may flow to the service volume reservoir 9 by way of a passage 106, a pipe 107, and a pipe 108. The passage 106 is also open to the under side of a ball check valve 109 and the pipe 107 is also open to the slide valve seat of the cut-off valve device 4.

The valve 104 is contained in a chamber 110 formed in the cap portion 95, which chamber is closed at the top by a cap nut 111. This chamber is in open communication with a chamber 112 containing the ball check valve 109 by way of a passage 113 and also is in open communication with the brake cylinder device 12 by way of a passage 114 and pipe 115. Interposed between the cap nut 111 and the valve 104 is a spring 116 which at all times urges said valve toward its seating position.

At one side of the diaphragm 98 is a chamber 117 which is open at all times to atmosphere by way of an opening 118 in the casing 91 and the atmospheric chamber 93. Contained in this chamber 117 and operatively engaged by the diaphragm 98 is a follower 119 having a stem 120 which extends through an opening in the casing and which, at its lower end, is pivotally connected with the right-hand end of the lever 94. At the other side of the diaphragm 98 is a chamber 121 which is in constant open communication with the passage 114.

The intercepting valve device 11 comprises a casing and diaphragm 122 rigidly clamped around its periphery between two connected parts of the casing, and having, at one side, a chamber 123 which, as shown, may be connected with the auxiliary reservoir 13 by way of a valve chamber 124, passage 125, and pipe 126. At the other side of the diaphragm 122 is a spring chamber 127 which is in constant open communication with the brake controlling valve device 3 by way of a connected pipe and a passage 128 and is in valve controlled communication with the auxiliary reservoir 13 by way of passages 129 in a wall 130 of the casing, a valve chamber 131, passage 125 and pipe 126.

Contained in the valve chamber 124 is a valve 132 having a fluted stem 133 which extends through a suitable bore in the casing so that its lower end may be operatively engaged by a portion of a follower 134 secured to the diaphragm 122. Interposed between and operatively engaging a cap nut 135 at the top of the chamber 124 and the valve 132 is a spring 136 which urges said valve toward its seated position.

Contained in the chamber 131 is a valve 137 arranged to engage a valve seat 138 formed in the bottom wall of the chamber and thereby interrupt the communication between the auxiliary reservoir 13 and the brake controlling valve device 3 as will later more fully appear. For limiting the upward movement of the valve 137, said valve is provided with a flange 139 which normally engages the bottom surface of the wall 130 between chambers 127 and 131. The valve 137 is secured by screw-thread or other suitable means to a guide member 140 which is slidably mounted in a suitable sleeve portion 141 of the wall 130 which sleeve portion is contained in chamber 127.

Contained in chamber 127 and interposed between the upper flanged end of the guide member 140 and the wall 139 is a coil spring 142 which encircles the sleeve portion 141 and the guide member 140 and constantly urges the guide member, and thereby the valve 137, toward their upper positions, in which position the flange 139 of the valve 137 abuts the wall 130. As explained later, this spring 142 is a reduction limiting spring which determines when the valve 137 will be moved into its lower seated position. Contained in a recess 143 formed in the guide member 140 is a spring 144, the upper end of which operatively engages the under side of the diaphragm follower 134 and the lower end engages the bottom wall of the recess. This spring exerts an upwardly directed force on the follower 134 so as to cause the follower to normally engage the bottom of stem 133 of the valve 132 and hold the valve in its unseated position as shown.

OPERATION

Initial charging of the equipment

Assuming the vehicle embodying the invention to be empty or separated from a train, the brakes on the vehicle released, the brake pipe 1 on the vehicle depleted of fluid under pressure and the fulcrum member 89 of the variable load valve mechanism 8 temporarily disposed in the empty position in which it is shown, the brake controlling valve device 3 will be in brake applied position and the several other parts of the equipment will be in the positions in which they are shown.

Now if the empty vehicle is placed in a train, the brake pipe 1 will of course be connected at each end of the vehicle to the corresponding brake pipe at the adjacent end of each adjacent vehicle of the train and as a result the brake equipment will be in condition to be charged with fluid under pressure in the usual manner. In initially charging the equipment fluid under pressure supplied in the usual manner to the brake pipe 1 flows through a branch pipe 2 to the chambers at the faces of the service and emergency pistons of the brake controlling valve device 3, moving the pistons in due course to release and charging position. Fluid under pressure will then flow to the several chambers of the brake controlling valve device 3, and thence in the usual manner, to the auxiliary reservoir 13 by way of the pipe 128, the chamber 127, passages 129, chamber 131, and passage 125 in the intercepting valve device 11, and pipe 126, and to the emergency reservoir 14 by way of a pipe 145. At the same time, fluid under pressure will also flow from the brake pipe 1 through passage 21 and connected pipe and passage 20 to valve chamber 19 in the cut-off valve device 4. From chamber 19 fluid under pressure flows through pipe and passage 75 to chamber 74 of the locking mechanism 7. Upon an increase in the pressure of fluid in this chamber 74 to a predetermined value, the piston 73 is caused to move downwardly against the opposing pressure of the spring 78, thereby moving the toothed locking portion 80 out of locking engagement with the toothed portion 84 of the bar 85, thus releasing the bar.

The piston 73 as it moves downwardly passes the mouth of the passage 71, thereby establishing communication between chamber 74 of the locking mechanism and chamber 67 of the load measuring apparatus by way of said passage and check valve device 6. Fluid under pressure will flow from chamber 74 through pipe and passage 71, and passage 72 to passage and pipe 68 and also past ball check valve 70 to chamber 69 in the check valve device 6, and thence by way of pipe and passage 68 to chamber 67 and therefore to the face of the piston 59. In response to the pressure of fluid thus supplied to chamber 67, piston 59 will move to the right against the opposing pressure of spring 62, effecting through the medium of the stem 64 and pin 65, the movement of the lever 66. Since the upper end of the lever 66 is held in its left-hand position by the pressure of the spring 90, the lever will be caused to rock in a counterclockwise direction about the pin 86. As the lever rocks in this manner it engages the roller 54 of the measuring mechanism 36, causing the connected members 56, roller 54 and pin 55 to rock in a clockwise direction about the pin 46. The member 57, being coupled directly to the pin 55 and to the pin 47 and thereby to member 56 and portion 41 of the measuring element, will force the element 38 downwardly against the opposing force of spring 52 until the bottom surface of the portion 39 of the element engages the periphery of the axle 40 at a point located substantially at the middle of its length, the links 42 and 43 rotating in unison in a clockwise direction to so control the element as to maintain the bottom surface of the arm 39 thereof in substantially parallel relation to the horizontal plane of the adjacent surface of the central portion of the axle 40.

With the vehicle empty, the movement of the piston 59 will be taken up entirely in actuating the load measuring mechanism 36 and therefore no movement will be imparted to the fulcrum positioning bar 85 by the piston 59. The fulcrum member 89 of the load compensating valve mechanism 8 will therefore remain in the position in which it is illustrated, which is the position for braking an empty vehicle.

Now when the pressure of fluid in the valve chamber 19 of the cut-off valve device 4 has increased to approximately thirty pounds per square inch, the diaphragm 16 will be caused to deflect upwardly against the opposing pressure of the spring 25. The diaphragm, as it is thus deflected, acts through the medium of the stem or follower 27 to shift the slide valve 26 to its uppermost position, in which position a cavity 146 in the valve connects pipe and passage 75 and a pipe and passage 147 to a passage 148 which leads to the atmosphere. With this connection thus established, fluid under pressure in piston chamber 74 of the locking mechanism 7 will be vented to atmosphere by way of pipe and passage 75, cavity 146 and passage 148. Also, fluid under pressure will flow from chamber 67 of the load measuring apparatus 5 through pipe and passage 68, passage 72 of the check valve device 6, pipe and passage 71 to chamber 74. Since passage 72 is of restricted flow capacity, the fluid pressure in chamber 74 will reduce much more rapidly than in chamber 67.

When the pressure of fluid in chamber 74 is slightly less than that of the spring 78, said spring will act to shift the piston 73 upwardly, bringing the locking portion 80, through the medium of the stem 79 into locking engagement with the toothed portion 84 of the fulcrum shifting bar 85. With the piston 73 in its uppermost position, pipe and passage 71 are connected to atmosphere by way of chamber 76 and a passage 77 in the casing and leading from chamber 76 to the atmosphere. Fluid under pressure flows from chamber 67 through pipe 68, passage 72 and pipe 71 to chamber 76 and thence to atmosphere by way of passage 77. When the fluid pressure in chamber 67 acting upon piston 59 is slightly less than the opposing pressure of the spring 62, said spring will cause the piston 67, stem 64 and the lever 66 to return to the positions in which they are shown. With the force of piston 59 which operates the measuring mechanism 37 removed, the spring 52 will act to retract the measuring mechanism to the position in which it is shown.

From the preceding paragraph it will be observed that the locking mechanism 7 is always operated to lock the fulcrum shifting bar 85, and thereby fulcrum member 89 of the variable load valve mechanism 8, before the measuring mechanism 37 is retracted from contact with the axle. With the chambers 67 and 74 thus vented of fluid under pressure, lock controlling piston 73, measuring apparatus controlling piston 59, and lever 66 which had been previously displaced are now returned to the position to which they are shown, and, with the cut-off valve device 4 being maintained by fluid at brake pipe pressure in the position to which it was previously moved, the equipment is now conditioned for braking an empty vehicle.

*Service application of the brakes on an empty vehicle*

When it is desired to effect an application of the brakes, the brake pipe pressure is reduced in the usual manner, causing the brake controlling valve device 3 to function to supply fluid under pressure from the auxiliary reservoir 13 to the brake cylinder device 12 by way of the intercepting valve device 11 in order to advance the usual brake shoes, not shown, into frictional engagement with the vehicle wheels. The flow of fluid under pressure from the auxiliary reservoir 13 to the brake cylinder device 12 is by way of a pipe 126, passage 125 in the intercepting valve device 11, past valve seat 138 and valve 137 into chamber 131, thence through passages 129 to chamber 127 and pipe 128, through the brake control valve device 3 and brake cylinder pipe 149. At the same time, fluid under pressure flows from the brake cylinder pipe 149 through pipe 115 and passage 114 to chamber 121 in the variable load valve mechanism 8, and by way of passage 114 to valve chamber 110, and thence by way of passage 113 to check valve chamber 112. Fluid under pressure thus supplied to chamber 121 causes the diaphragm 98 to flex downwardly, and the diaphragm 98 as it is thus being flexed acts through the medium of the follower 119 and follower stem 120 to rock the lever 94 about the fulcrum member 89 in a clockwise direction, the lever 94 as is thus operated acting through the medium of the follower stem 102, follower 101, and diaphragm 97 to cause the valve 104 to be unseated against the opposing pressure of the spring 116 and of the fluid in chamber 110 acting on the valve. With the valve 104 unseated, fluid under pressure flows from the valve chamber 110 past the unseated valve 104 and its fluted stem 105 into chamber 103, from whence it flows by way of passage 106, pipes 107 and 108 to the service volume reservoir 9.

It should here be noted that at this time the slide valve 26 of the cut-off valve device 4 will be in its uppermost position, in which position communication between pipe 107 and emergency volume reservoir 10 is closed, and there will therefore be no flow of fluid under pressure from the brake cylinder pipe to the emergency volume reservoir 10.

When the pressure of fluid in diaphragm chamber 103 of the variable load valve mechanism 8 and consequently in the reservoir 9 becomes sufficient to overcome the pressure of fluid in chamber 121 acting in the opposite direction on the lever 94, the diaphragm 97 will be caused to flex in a downward direction and thereby permit the spring 116 to seat the valve 104, closing off the further flow of fluid under pressure to volume reservoir 9. Since further build-up of pressure in chamber 103 can not occur, the lever 94 will come to rest in the position in which it is shown.

It will here be understood that the brake leverage ratio and the brake cylinder volume will be such as to be able to attain with a single brake cylinder the maximum braking required, or in other words to attain the desired degree of braking for a fully loaded vehicle. From the foregoing paragraph it is apparent that, when a service application of the brakes is effected with the fulcrum member 89 in the position in which it is shown, the maximum amount of fluid under pressure is spilled or bled from the brake cylinder pipe 149 into the service volume reservoir 9 and consequently there is obtained the minimum brake cylinder pressure for a given reduction in brake pipe pressure. As will hereinafter more fully appear the fulcrum member 89 is shifted to the right from the position in which it is shown in accordance with the added weight of any lading placed on the vehicle, so that the leverage or mechanical advantage will be resolved in favor of the diaphragm 97. Consequently the pressure of fluid in chamber 103 will not have to become as high as that in chamber 121 in order to seat the valve 104 and terminate the flow of fluid under pressure from the brake cylinder pipe 149 to the volume reservoir. Thus, as the weight of the load carried by the vehicle is increased, the amount of fluid under pressure that will flow to the volume reservoir is decreased and as a consequence the force exerted by the brake cylinder device, for any degree of brake pipe reduction, will increase as the load increases.

When, at the start of the brake application on the empty vehicle, the brake controlling valve device 3 operates in the usual manner to supply fluid under pressure from the auxiliary reservoir 13 to the brake cylinder device 12, fluid under pressure will flow from chamber 123 past the fluted valve stem 133 and valve 132 into valve chamber 124, and thence by way of passage 125 past valve 137, through the chamber 131, passage 129, chamber 127 and passage and pipe 128 to the brake controlling valve device 3. Because the volume of chamber 123 is larger than the combined volume of chambers 127 and 131 and by reason of a choke 125a in passage 125 as shown, the pressure of fluid in chamber 127 will reduce more rapidly than that in chamber 123. In response to the excess of fluid pressure acting on the upper side of the diaphragm 122 the diaphragm will be caused to deflect downwardly against the opposing pressure of the spring 144 until the bottom of the follower 134 engages the top of the guide member 140, the downward movement of said guide member being stopped at this time by the action of the spring 142. However, this movement of the follower 134 will be sufficient to permit the spring 136 to actuate the valve 132 to its seated position. The pressure of fluid thus bottled up in chamber 123 is now the standard with which the pressure of fluid at reduced auxiliary reservoir pressure in chamber 127 will be compared.

If the brake controlling valve device 3 continues to operate to supply fluid under pressure from the auxiliary reservoir 13 to the brake cylinder device 12 in the application of the brakes just previously described, the pressure of fluid in the auxiliary reservoir 13, and consequently in the interconnected chamber 127, will continue to decrease until the pressure therein is 20 pounds less than that in chamber 123, at which time the diaphragm 122 will be caused by the higher pressure in chamber 123 to deflect downwardly against the opposing pressure of spring 142. The diaphragm, as it is thus deflected, acts through the medium of the follower 134 and guide member 140 to move the valve 137 downwardly to its lowermost position, in which position said valve engages the valve seat 138. With the valve 137 thus seated, the flow of fluid under pressure from the auxiliary reservoir 13 to the valve device 3 occurring during a service application of the brakes will be terminated for that brake application, regardless of the degree of brake pipe reduction.

*Release of a service application of the brakes on an empty vehicle*

When it is desired to effect the release of the brakes, the brake pipe pressure is increased in the usual manner, causing the brake controlling valve device 3 to function to establish communication from a brake cylinder device 12 to atmosphere by way of the retaining valve device 15. Fluid under pressure now flows by way of pipe 149 from the brake cylinder device 12 to the brake controlling valve device 3 and from there by way of pipe 150 to the retaining valve device 15 which connects pipe 150 directly to the atmosphere when a handle 151 on device 15 is in the position in which it is shown. The brake cylinder device 12 now responds to the release of fluid under pressure therefrom in the usual manner to effect a release of the vehicle brakes.

Valve chamber 110 and chamber 121 being connected by way of passage 114 and pipe 115 to brake cylinder pipe 149, fluid under pressure will flow from these chambers to the atmosphere with the fluid under pressure flowing from the brake cylinder device 12. Valve chamber 112 being connected to valve chamber 110 by way of passage 113, fluid under pressure therein will also flow to atmosphere by the same route. With the pressure of fluid in chamber 112 reduced due to the flow of fluid therefrom, the pressure of fluid beneath the ball check valve 109 will lift the check valve to permit the flow of fluid from the service volume reservoir 9 to atmosphere by way of pipes 108 and 107, and passage 106 past the unseated check valve 109 into chamber 112 which is now connected to atmosphere by way of the route previously described. Fluid under pressure in chamber 103 may also flow by way of passage 106 and past ball check valve 109 into valve chamber 112 and thence to atmosphere.

The brake controlling valve device 3 also functions at this time to supply fluid under pressure from the brake pipe 1 to the auxiliary and emergency reservoirs 13 and 14, respectively. As previously described in connection with initial charging of the equipment, fluid under pressure in brake pipe 1 will flow through branch pipe 2 to the brake controlling valve device 3 and from thence by way of connected pipe and passage 128 to chamber 127 in the intercepting valve device 11, through passages 129 to chamber 131. When the pressure of fluid in chamber 127 located at the underside of the diaphragm 122 is within less than twenty pounds of that in chamber 123, the spring 142 will act to move the guide member 140 and thereby the valve 137, upwardly until the flange 139 of said valve engages the bottom surface of the wall 130 formed in the casing. With the valve 137 thus positioned out of engagement with the seat 138, as shown in the drawing, communication is established by which fluid under pressure supplied from the brake pipe 1 to chamber 127 flows past valve seat 138, through passage 125 and pipe 126 to auxiliary reservoir 13.

The guide member 140 as it is being moved upwardly, effects, through the medium of a follower 134, an upward deflection of the diaphragm 122. Upon a further build-up of pressure in chamber 127, spring 144 will be permitted to move the diaphragm 122 upward, thereby moving the follower 134 out of engagement with the member 140. Thereafter a further increase in the fluid pressure in chamber 127 will cause diaphragm 122 to deflect upwardly and act through the medium of the follower 134 and valve stem 133 to move the valve 132 upwardly, against the opposing pressure of a spring 136, to its unseated position. With the valve 132 unseated, fluid under pressure supplied to passage 125 for charging the auxiliary reservoir 13 will also flow through chamber 124, past valve 132 and fluted valve stem 133 into chamber 123, charging chamber 123 with fluid at auxiliary reservoir pressure.

In connection with the foregoing description it should be mentioned that, with the brake controlling valve device of the standard fluid pressure brake equipment now in use operating in the usual manner in response to a full service brake application, when the brake pipe pressure has been reduced from seventy pounds to approximately fifty pounds, the auxiliary reservoir will be in open communication with the brake cylinder and as a consequence the auxiliary reservoir pressure will equalize with the brake cylinder pressure at approximately fifty pounds which corresponds with the reduced brake pipe pressure. Since the pressures of fluid in the auxiliary reservoir and brake cylinder are now equal, a further reduction in brake pipe pressure cannot increase the pressure of fluid in the brake cylinder.

It will be apparent to those familiar with the operation of the standard fluid pressure brake equipment mentioned in the preceding paragraph that if the intercepting valve 11 were omitted and the remaining features of the invention were combined with the brake controlling valve device 3, certain undesirable operations may occur. For example, when a full service reduction of twenty pounds in brake pipe pressure is effected, the brake controlling valve device will of course move to application position and in this position will supply fluid under pressure from the auxiliary reservoir to the brake cylinder, and to the service volume reservoir 9 also if the vehicle is empty or lightly loaded. The amount of fluid flowing from the auxiliary reservoir will be substantially the same as in the standard brake equipment. Since the volume of the brake cylinder, to which may be added the volume of the service volume reservoir, is greater than that of the standard brake cylinder, the pressure of the brake cylinder will be substantially less for a full service reduction in brake pipe pressure. When, due to the flow of fluid from the auxiliary reservoir to the brake cylinder and volume reservoir 9, the auxiliary reservoir pressure reduces slightly below the reduced brake pipe pressure (fifty pounds), the brake controlling valve device will move to lap position and thereby cut off the flow of fluid from the auxiliary reservoir. In this position the brake controlling valve device will bottle up the fluid in the auxiliary reservoir at a higher pressure than has been attained in the brake cylinder, so that if a further reduction were effected the brake controlling valve device would function to again supply fluid under pressure from the auxiliary reservoir to the brake cylinder and service volume reservoir and thus effect an increase in the pressure of fluid in the brake cylinder beyond a safe or desirable degree. As will hereinafter more fully appear, such an undesirable condition is most likely to occur in cycling the brakes in descending a grade, that is to say, in alternately effecting an application of the brakes and then recharging the equipment partially while a partial release is taking place through the usual retaining valve device which has previously been set to retain a predetermined pressure in the brake cylinder. It will be apparent from the foregoing description that by the use of the intercepting valve device 11 this undesirable increasing of brake cylinder pressure due to an over-reduction in brake pipe pressure, which may be effected in cycling the brakes, is entirely eliminated since the device functions in response to a twenty pound reduction in auxiliary reservoir pressure from any pressure to which the reservoir is recharged to close the supply communication from the auxiliary reservoir to the brake controlling valve device.

*Emergency application of the brakes on an empty vehicle*

When it is desired to effect an emergency application of the brakes, an emergency reduction in brake pipe pressure is effected in the usual well known manner which causes the several parts of the brake controlling valve device 3 to move to their emergency positions. With the operating parts in their emergency positions, communication is established by which fluid under pressure is supplied from both the auxiliary reservoir 13 and the emergency reservoir 14 through pipe 149 to the brake cylinder device 12 to obtain greater brake cylinder pressure than that obtained by a full service application.

As previously described for a service application of the brakes on an empty vehicle, fluid under pressure in pipe 149 also flows by way of pipe 115 and passage 114 to chambers 121 and 110 in the variable load valve mechanism 8. In response to the pressure of fluid in chamber 121 acting upon diaphragm 98, said diaphragm deflects downwardly and acts through the medium of follower 119 and stem 120 to rock the lever 94 about the fulcrum member 89 in a clockwise direction, the lever, as it is thus being rocked, acting through the medium of the stem 102, follower 101, diaphragm 97, and valve stem 105 against the opposing pressure of spring 116 to unseat the valve 104. Fluid under pressure supplied from the auxiliary and emergency reservoirs 13 and 14, respectively, to chamber 110 now flows past valve 104 and fluted valve stem 105 into chamber 103, whence it will flow to the service volume reservoir 9 by way of passage 106, pipe 107 and pipe 108.

In the description of the effecting of a service application of the brakes on an empty vehicle, it was noted that the flow of fluid from the brake cylinder device 12 was terminated when the fluid pressure in the service volume reservoir 9, and therefore in chamber 104 acting upon diaphragm 97, was high enough to counterbalance the brake cylinder pressure in chamber 121 acting upon diaphragm 98 so as to permit valve 104 to seat. Obviously, if the cubic content of the brake cylinder device 12 were greater, the brake cylinder pressure at the time when valve 103 is seated would be higher, or if the cubic content of the reservoir 9 were greater, the brake cylinder pressure would be lower at the time when the valve 104 was seated. Since during an emergency application the brake cylinder pressure is increased and also the auxiliary and emergency reservoirs are both open to the brake cylinder device, thereby adding their volumes to the brake cylinder volume, means are provided for connecting the emergency volume reservoir 10 to reservoir 9 as a supplementary volume in order to prevent the occurrence of an unreasonably high or unsafe brake cylinder pressure.

When an emergency reduction in brake pipe pressure is effected, the brake pipe 1 is depleted of fluid under pressure in the usual manner by the brake controlling valve device 3. Since chamber 19 in the cut-off valve device 4 is connected by way of pipe and passage 20, passage 21 and branch pipe 2 to the brake pipe, it will likewise be depleted of fluid under pressure. The resulting reduction in the pressure of fluid in chamber 19 to atmospheric pressure will permit the pressure of the spring 25 acting through the medium of the stop member 22 and follower or stem 27 to actuate the slide valve 26 to its lowermost position, in which position it is shown. Cavity 146 in the slide valve 26 which formerly connected the emergency volume reservoir 10 to atmosphere as previously noted now establishes communication between pipe 107 and said reservoir. Fluid under pressure now flows from chamber 103 in the variable load valve mechanism 8 through passage 106 to pipe 107, whence it flows by way of pipe 108 to service volume reservoir 9 and by way of cavity 146 in slide valve 26 to pipe 147 and emergency volume reservoir 10. When the pressure of fluid in chamber 103 approximates that in chamber 121 the various operative parts of the mechanism 8 will return to the position in which they are shown and the brake cylinder pressure will have been reduced to a degree compatible with safe braking of an empty or partially loaded vehicle.

Referring now to the intercepting valve device 11, said device will function as hereinbefore described in connection with a service brake application on an empty vehicle to cut off the flow of fluid under pressure from the auxiliary reservoir 13 to the brake controlling valve device 3 when, by reason of the operation of the variable load valve mechanism 8 in this instance, the fluid pressure of the auxiliary reservoir is reduced more than twenty pounds below the pressure at the initiation of the emergency brake application. Thus, if the initial pressure were seventy pounds the auxiliary reservoir pressure will not drop below approximately fifty pounds, thereby conserving the fluid under pressure in the auxiliary reservoir and aiding in the prevention of excessive brake cylinder pressures. It does not, however, affect the flow of fluid under pressure from the emergency reservoir for which the emergency volume reservoir 19 and the function of the cut-off valve device 4 described in the preceding paragraph are provided.

*Release of the brakes after an emergency application and automatic changeover operation of the equipment from empty vehicle to a loaded vehicle condition*

When it is desired to effect the release of the brakes after an emergency application on a vehicle equipped with the described embodiment of the invention, the brake pipe will be charged with fluid under pressure in the same manner as hereinbefore described in connection with the initial charging of the equipment. As before described, fluid under pressure supplied to the brake pipe 1 will flow by way of branch pipe 2 to the brake controlling valve device 3, from whence it will flow by way of passage 21 and pipe and passages 20 to cut-off valve device 4 and from valve chamber 19 therein to chamber 74 in the locking mechanism 7 by way of connected pipe and passages 75. In response to an increase in the fluid pressure in chamber 74, piston 73 will move downwardly against the pressure of spring 78, thereby causing the locking portion 80 to move out of locking engagement with the toothed portion 84 of the bar 85 and also effecting by way of a check valve device 6 the supply of fluid under pressure to chamber 67 in the measuring apparatus 5. The pressure of fluid thus supplied to chamber 67 will cause the piston 59 to effect the downward movement of the measuring mechanism 37 until stopped by portion 39 of the mechanism engaging the axle 40.

In setting a car out of a train it is the usual practice to effect an emergency application of the brakes.

Assuming now that while the car is thus set out and lading has been placed on the body of the car and under the influence of such additional weight on the vehicle body, the center sill 34 will have moved downwardly relative to the axle 40 by reason of the usual truck springs (not shown) yielding to the additional weight. The space between the center sill 34 and the axle 40, and consequently between the portion 39 of the measuring element 37 and the axle, having been shortened because of the yielding of the spring under the influence of the load, the portion 39 will engage the axle 40 before piston 59 has completed its full stroke. As a result, the piston 59 will now cause the lever 66 to rotate in a clockwise direction about its lower end which is now in engagement with the roller 54 of the now stationary mechanism 36, the roller of course, being stationary and serving as a fulcrum for the lever. Movement of the upper end of the lever 66 in this direction will be yieldably opposed by the force of the spring 90 while the piston completes its stroke. The lever 66 as it is thus being moved acts to shift the bar 85 and the fulcrum roller 89 associated therewith toward the right along the scale beam lever 94 until such time as the piston comes to a stop at the end of its stroke, the distance of travel of the roller 89 being proportional to the distance of piston travel after the measuring element is brought to a stop by its engagement with the axle.

When the brake pipe pressure is increased to the degree required to effect the operation of cut-off valve device 4, this device will operate, as hereinbefore described, to vent fluid under pressure from chambers 74 and 67, and emergency volume reservoir 10. With the chamber 74 thus vented, the piston 73 and the stem 79 of the locking mechanism 7 respond to the force of the spring 78 to move the locking portion 80 into engagement with the toothed portion 84 of the bar 85 to hold the bar and thereby the fulcrum member 89 in their newly assumed positions.

With the chamber 67 of the load measuring apparatus 5 vented of fluid under pressure, the spring 62 acts to return the piston 59 and piston stem 64 to the position in which they are shown. In so doing, it will cause the lever 66 to be rotated clockwise about the pin 86 which is now locked, through the medium of the bar 85 and portion 80, in a position corresponding to the degree of lading on the vehicle. As the lower end of the lever is withdrawn from engagement with the measuring mechanism 37 the spring 52 will act to retract the mechanism from engagement with the axle 40 to the position in which it is shown. With the position of the fulcrum member 89 relative to the scale beam lever 94 of the variable load valve mechanism 8 determined according to the amount of movement of piston 59 transferred by the lever 66 from the mechanism to the fulcrum shifting bar 85, and the transfer of movement being determined according to the load on the vehicle, the variable load valve mechanism is now in condition for braking a partially or fully loaded vehicle as the case may be.

Fluid under pressure supplied to the brake pipe 1 also flows to the chambers at the faces of the service and emergency pistons of the brake controlling valve device 3, moving the pistons in due course to release and charging position. Fluid under pressure will then flow into the several chambers of the brake controlling valve device 3, and thence to the emergency reservoir 14 by way of pipe 145 and to chamber 127 in the intercepting valve device 11 by way of connected pipe and passage 128. As previously described in connection with the release of the brakes after service application of an equipment conditioned for empty braking, when the pressure of fluid in chamber 127 at the under side of the diaphragm 122 rises to a pressure within less than twenty pounds of that in chamber 123, that is, above fifty pounds, in this instance, the pressure of the spring 142 will operate to move the guide member 140 and thereby the valve 137 upwardly until the flange 139 of said valve engages the lower surface of the wall 130 formed in the casing. With the valve 137 out of engagement with the seat 138, communication is established by which fluid under pressure supplied from the brake pipe 1 to chambers 127 and 131 flows past valve seat 138, through passage 125 and pipe 126 to auxiliary reservoir 13

When the operative parts of the brake controlling valve device 3 move to release position, said device functions to establish communication from the brake cylinder device 12 to atmosphere by way of the retaining valve device 15. Fluid under pressure will flow from the brake cylinder device 12 to the atmospheric passage in the retaining valve device 15 by way of pipe 149, brake controlling valve device 3 and pipe 150. The brake cylinder device 12 now responds to the release of fluid under pressure therefrom in the usual manner to effect a release of the vehicle brakes.

Fluid under pressure also flows from chambers 121 and 110 in the variable load valve mechanism 8 to atmosphere, being connected to brake cylinder pipe 149 by way of passage 114 and pipe 115. Fluid under pressure in the service volume reservoir 9 flows by way of pipe 108, pipe 107, passage 106, past back check valve 109 to chamber 112, and thence by way of passage 113 to chamber 110 and to atmosphere by the same route. It should here be noted that when slide valve 26 of the cut-off valve device 4 was actuated to its uppermost position upon the attainment of thirty pounds pressure in the brake pipe, fluid under pressure in the emergency volume reservoir 10 was connected to atmosphere by way of pipe and passage 147, cavity 146 and passage 148.

*Application of the brakes on a partially loaded vehicle*

When an application of the brakes is made on a partially loaded vehicle by effecting a reduction in brake pipe pressure, the operation of the brake controlling valve device 3 will be identical with the operation described for an empty vehicle. From this it will be understood that fluid under pressure will be supplied through pipe 149 to the brake cylinder device 12, from pipe 149 by way of pipe 115 and passage 114 to chambers 121 and 110 in the variable load valve mechanism 8 in the manner previously described for the application of the brakes for an empty vehicle.

The pressure of fluid in the chamber 121 deflects the diaphragm 98 and the follower 119 downwardly, thereby rocking lever 94 in a clockwise direction about the fulcrum member 89, which is now located at some point intermediate the position in which it is shown and the right-hand end of the lever 94. When the fluid pressure in said chamber is sufficient to outweigh the opposing pressure of spring 116 acting upon the left-hand end of lever 94, the resultant clockwise rocking of the lever will cause the diaphragm 97 to deflect upwardly against the stem 105 and thereby against the opposing force of the spring 116 to unseat the valve 104. With the valve unseated, fluid under pressure from the brake cylinder pipe 149 flows through pipe 115, passage 114, valve chamber 110, past the unseated valve 104 and its fluted stem 105, through chamber 103, passage 106, pipe 107 and pipe 108 to the service volume reservoir 9. When the pressure of spring 116 and of fluid in diaphragm chamber 103, and consequently in the reservoir 9, becomes sufficient to counterbalance the pressure of fluid in chamber 121 acting on the lever 94 said lever will be rotated counterclockwise, thereby causing valve 104 to seat and close off the further flow of fluid under pressure to the volume reservoir 9.

Since the fulcrum member 89 has been adjusted to the right of the position shown, the pressure in chamber 103 will not be as high as that on an equipment conditioned for empty braking and consequently the brake cylinder pressure will be higher for the additional load. When the vehicle is fully loaded, the fulcrum member will be shifted to its extreme right-hand position, in which position it will prevent entirely the operation of the diaphragm 98 and of the whole mechanism 8. Fluid in the brake cylinder device 12 will then build up to its maximum pressure for any particular degree of brake pipe reduction.

As previously stated, the operation of the intercepting valve device 11 becomes important in controlling the brake when the vehicle is descending a long grade. Preparatory to descending a grade, the retaining valve device 15 is set by turning the handle 151 from the position in which it is shown in the drawing to a position to retain a predetermined pressure in the brake cylinder device 12 when recharging reservoirs 13 and 14 after the initial application. It is to be understood that the pressure retained will be the minimum required to maintain the brake shoes in engagement with the vehicle wheel. In controlling the train on a descending grade it is customary to cycle the brakes, that is, to effect an application of the brakes and recharge the equipment while a partial release of the brakes is taking place through the adjusted retaining valve device, and alternately applying and releasing the brakes. It will be understood that it is highly desirable to have a brake equipment that will provide selectivity of brake operation regardless of the operating pressures and one that will also conserve the braking energy and yet will retain a reasonably heavy brake application available to the train operator.

Attention is therefore directed to the fact that the operator may obtain a brake application equivalent to a twenty pound brake pipe reduction, so long as there is reserve fluid pressure in the equipment, by reason of the device 11 setting the pressure of fluid in the auxiliary reservoir as a standard (in the closing of valve 132) and measuring a twenty pound reduction therefrom by the weighing of spring 142 and thereafter isolating the auxiliary reservoir (by the seating of valve 137). By providing a reset for each release operation (in the unseating of valve 132) the operator may again effect a twenty pound reduction in auxiliary reservoir pressure although the auxiliary reservoir has not been recharged to its initial pressure. By preventing an over-reduction in auxiliary reservoir pressure the operator is compelled to conserve his reservoir pressure and at the same time prevent excessive brake cylinder pressure from being attained as a result of an over-reduction in brake pipe pressure.

*Summary*

Thus, it will be seen from the foregoing that there is provided a variable load brake equipment of the type employing a single brake cylinder and which is automatically adjusted, during the charging of the brake pipe 1 from atmospheric pressure, to vary the braking force exerted by said brake cylinder for a given reduction in the pressure in the brake pipe according to the weight of the load on the vehicle. As the pressure in the brake pipe is increased above atmospheric pressure during the charging of the brake pipe, the cut-off valve device 4 permits fluid under pressure to flow from the brake pipe 1 to the locking mechanism 7 which mechanism operates in response to the pressure of fluid thus supplied to unlock the load measuring apparatus 7 and then to supply fluid under pressure from the brake pipe to said apparatus. In response to the pressure of fluid thus supplied, the load measuring apparatus actuates the measuring element 38 into engagement with the vehicle axle 40 and positions the fulcrum member 89 in the variable load valve mechanism 8 accordingly. When the pressure of fluid in the cut-off valve device reaches a predetermined degree the cut-off valve device operates in response thereto to cut off the further flow of fluid under pressure to the locking mechanism and the load measuring apparatus and connects said mechanism and apparatus to atmosphere so that first the locking mechanism and then the load measuring apparatus are vented.

The apparatus being thus adjusted, when a reduction in the pressure of fluid in the brake pipe is effected, the brake controlling valve device 3 will operates in the usual manner to supply fluid under pressure to the brake cylinder and also to the variable load valve mechanism 8. If the vehicle is less than fully loaded, the mechanism 8 will operate in response to the pressure of fluid thus supplied from the brake controlling valve device to spill or bleed a portion of this fluid under pressure into the service volume reservoir 9 until the scale beam lever 94 is balanced, thereby reducing the braking power of the brake cylinder according to the weight of the load as determined by the adjusted position of the fulcrum member 89 in the variable load valve mechanism 8. If the vehicle is fully loaded the mechanism 8 will be inoperative because the adjustment for the weight of the load on the vehicle will be such that the fulcrum member 89 will be directly under the diaphragm 98 so that deflection of the diaphragm to operate the mechanism will be prevented.

Now, if the reduction of brake pipe pressure should be of a degree such that the pressure of fluid in the auxiliary reservoir 13 would be reduced more than 20 pounds below the pressure present in the auxiliary reservoir at the initiation of the brake application, the intercepting valve device 11 will limit such reduction in the pressure of fluid in the auxiliary reservoir to 20 pounds by operating in response to such reduction to cut off the further flow of fluid under pressure from the auxiliary reservoir to the brake controlling valve device. If the brakes are alternately applied and released as in cycling on long descending grades, the intercepting valve device will automatically reset so as to measure a 20 pound reduction from the degree of pressure present in the auxiliary reservoir at the initiation of that particular brake application.

If the pressure of fluid in the brake pipe is reduced to atmospheric pressure at an emergency rate, the brake controlling valve device will operate in the usual manner to effect an emergency application of the brakes by connecting the emergency reservoir 14 also to the brake cylinder device. With the charged volume increased, it becomes necessary to increase the volume into which the fluid under pressure supplied from the brake controlling valve device to the brake cylinder may be spilled. Therefore, when the pressure of fluid in the brake pipe is reduced below the pressure at which the cut-off valve device previously operated to cut-off the brake pipe from the locking mechanism, the cut-off valve device will not only operate to cut in the brake pipe but will also operate to connect the emergency volume 10 with the service volume reservoir 9 and thereby establish that relation between pressures and volumes which is proper for an emergency application.

When the brake controlling valve device 3 moves to release position in response to an increase in the pressure of fluid in the brake pipe, said device will function to vent fluid under pressure from the brake cylinder device to atmosphere by way of the retaining valve device 15.

From the foregoing it will be readily apparent that since the standard volumes and passages used in the "AB" freight brake equipment are retained in the use of this invention, the brake application and release times will be the same as those for the "AB" equipment and therefore this apparatus will operate in harmony with the "AB" equipment, the response to the effecting of a brake application on the train will be the same regardless of the load on the vehicle, and a brake application equivalent to a 20 pound reduction in the pressure in the brake pipe will always be available to the operator.

Having now described my invention what I claim as new and desire to secure by Letters Patent, is:

1. In a variable load fluid pressure brake equipment for a vehicle, in combination, a brake cylinder, a brake controlling valve device operative to supply fluid under pressure to the brake cylinder to effect an application of the brakes, a reservoir arranged to receive fluid supplied by the brake controlling valve device to control the pressure of fluid in the brake cylinder, valve means subject to the opposing pressures of fluid in said reservoir and brake cylinder and operative in response to an increase in the pressure of fluid in the reservoir for controlling the amount of fluid flowing to the reservoir, and means operative according to different weights of lading carried by the vehicle for variously conditioning said valve means for response to different reservoir pressures to provide the pressure of fluid in the brake cylinder for any given weight of lading carried by the vehicle.

2. In a variable load fluid pressure brake equipment for a vehicle, in combination, a brake cylinder, a brake controlling valve device operative to supply fluid under pressure to the brake cylinder to effect an application of the brakes, a reservoir arranged to receive fluid supplied by the brake controlling valve device to control the pressure of fluid in the brake cylinder, valve means subject to the opposing pressures of fluid in said reservoir and brake cylinder and operative in response to an increase in the pressure of fluid in the reservoir for controlling the amount of fluid flowing to the reservoir, and means operative according to different weights of lading carried by the vehicle for variously conditioning said valve means for response to different reservoir pressures to provide the pressure of fluid in the brake cylinder for any given weight of lading carried by the vehicle, said means being operative when the vehicle is heavily loaded to render said valve means ineffective to permit the flow of fluid from the brake cylinder to said reservoir and thereby render the reservoir ineffective to control the brake cylinder pressure.

3. A vehicle variable load fluid pressure brake equipment, in combination, a brake cylinder device, a volume reservoir, a brake controlling valve device operative to supply fluid under pressure to said brake cylinder device, valve means operative to control the flow of fluid under pressure from said brake controlling valve device to said volume reservoir and to thereby vary the pressure of fluid in said brake cylinder device, and means for adjusting said valve means in accordance with the weight of lading carried by the vehicle for operation in response to variations in the pressure of fluid supplied by said brake controlling valve device to proportion the amount of fluid under pressure which may flow to said volume reservoir inversely to the weight of the load carried by the vehicle.

4. A vehicle variable load fluid pressure brake equipment in combination, a brake cylinder device, a volume reservoir, a brake controlling valve device operative to supply fluid under pressure to said brake cylinder device, a valve mechanism interposed between said brake controlling valve device and said volume reservoir for permitting fluid being supplied to the brake cylinder to flow to the volume reservoir and operative in response to an increase in pressure of fluid in said reservoir for cutting off the flow of fluid to the reservoir according to the load carried by the vehicle by causing a certain amount of the fluid under pressure being supplied to the brake cylinder device to flow to said volume reservoir, the amount of fluid flowing to the reservoir varying inversely to the load carried by the vehicle, and means for adjusting said valve mechanism in accordance with the weight of the load carried by the vehicle for operation according to variations in the pressure of fluid supplied to the brake cylinder device to control the amount of fluid under pressure flowing to said volume reservoir.

5. In a vehicle variable load fluid pressure brake equipment, in combination, a brake cylinder device, a volume reservoir, a brake controlling valve device operative to supply fluid under pressure to said brake cylinder device, a conduit through which fluid under pressure may flow to said reservoir, and a valve mechanism operative to control the flow of fluid under pressure through said conduit from said brake controlling valve device to said volume reservoir and thereby control the pressure of fluid in said brake cylinder device, said valve mechanism being conditionable when the vehicle is fully loaded to prevent the flow of fluid under pressure to said volume reservoir and for operation according to variations in the pressure of fluid supplied by said brake controlling valve device and being conditionable when the vehicle is empty or partly loaded to provide for metering the fluid under pressure admitted to said volume reservoir in amounts varying inversely proportional to the weights of the load carried by the vehicle, and means operative as an incident to the charging of the equipment with fluid under pressure for conditioning said valve means.

6. In a vehicle variable load fluid pressure brake equipment, in combination, a brake cylinder device for providing braking power on a heavily loaded vehicle, a volume reservoir, valve means arranged to be cut into operation to provide decreased braking power on the vehicle when the vehicle is lightly loaded, means operative according to the load carried by the vehicle for conditioning said valve means for operation in response to any increase in the pressure of fluid in said brake cylinder device to permit proportional amounts of fluid to flow to said volume reservoir, the conditioning of said valve means being different for different loads carried by the vehicle so as to render said valve means operative to provide for the flow of different amounts of fluid under pressure to said volume reservoir and thereby control the braking power of said brake cylinder device according to the load carried by the vehicle.

7. The combination with a vehicle fluid pressure brake equipment of the type having a brake cylinder device, a volume reservoir, and a brake controlling valve device for supplying fluid under pressure to said brake cylinder device and said volume reservoir, of adjustable means operative in response to variations in the pressure of fluid supplied by said brake controlling valve device for varying the amount of fluid under pressure flowing from said brake controlling valve device to said volume reservoir to thereby vary the pressure of fluid in said brake cylinder device according to the adjustment of the adjustable means, and means operative in accordance with different weights of lading carried for adjusting said adjustable means.

8. In a variable load fluid pressure brake equipment for a vehicle, in combination, a brake cylinder, a brake controlling valve device operative to supply fluid under pressure to the brake cylinder, a volume reservoir, a conduit through which fluid under pressure being supplied by the brake controlling valve device may flow to said reservoir, valve means interposed in said conduit conditioned according to the weight of the lading carried by the vehicle for response to the pressure of the fluid being supplied by the brake controlling valve device for effecting the flow of fluid through said conduit and for response to the pressure of fluid being supplied to said reservoir for cutting off the flow of fluid through said conduit to provide different pressures of fluid in the brake cylinder for different weights of the lading carried.

9. In a variable load fluid pressure brake equipment for a vehicle, in combination, a brake cylinder, a brake controlling valve device operative to supply fluid under pressure to the brake cylinder, a volume reservoir, a conduit through which fluid under pressure being supplied by the brake controlling valve device may flow to said reservoir, valve means interposed in said conduit conditioned according to the weight of the lading carried by the vehicle for response to the pressure of the fluid being supplied by the brake controlling valve device for metering the amount of fluid flowing to said reservoir or for preventing the flow of fluid thereto to provide different pressures of fluid in the brake cylinder for different weights of lading carried by the vehicle.

10. In a variable load fluid pressure brake equipment for a vehicle, in combination, a brake cylinder, a brake controlling valve device operative to supply fluid under pressure to the brake cylinder, a volume reservoir, a conduit through which fluid under pressure being supplied by the brake controlling valve device may flow to said reservoir, valve means interposed in said conduit conditioned according to the weight of the lading carried by the vehicle for response to the pressure of the fluid being supplied by the brake controlling valve device for metering the amount of fluid flowing to said reservoir to provide different pressures of fluid in the brake cylinder for different weights of lading carried by the vehicle.

11. In a variable load fluid pressure brake equipment for a vehicle, in combination, a brake cylinder, a brake controlling valve device operative to supply fluid under pressure to the brake cylinder to effect an application of the brakes, a fluid reservoir into which fluid under pressure supplied by the brake controlling valve device flows to control the pressure of fluid in the brake cylinder, means subject to the opposing fluid pressures of the reservoir and brake cylinder and operative upon an increase in the pressure of fluid in the reservoir for limiting the amount of fluid flowing to the reservoir, and means adjustable according to different weights of lading carried by the vehicle for rendering said valve means responsive to different fluid pressures in the reservoir.

12. In a variable load fluid pressure brake equipment for a vehicle, in combination, a brake cylinder, a brake controlling valve device operative to supply fluid under pressure to the brake cylinder to effect an application of the brakes, a fluid receiver normally at atmospheric pressure for receiving fluid under pressure being supplied to the brake cylinder, a conduit through which the fluid under pressure flows to said fluid receiver, valve means interposed in said conduit conditioned according to the weight of the lading carried by the vehicle for response to the pressure of the fluid being supplied by the brake controlling valve device for either effecting the flow of fluid to said receiver and for controlling the amount of fluid flowing thereto or inhibiting the flow of fluid thereto to provide the pressure of fluid in the brake cylinder called for by the weight of the lading carried by the vehicle.

13. In a vehicle variable load fluid pressure brake equipment of the type comprising a brake pipe, an auxiliary reservoir, an emergency reservoir, a brake cylinder, and a brake controlling valve device operative in response to a service reduction in the pressure of fluid in said brake pipe to connect said auxiliary reservoir to said brake cylinder and operative in response to an emergency reduction in the pressure of fluid in the brake pipe to open communication between both reservoirs and the brake cylinder to effect an application of the brakes, in combination, a service volume reservoir, a variable load valve mechanism operative to vary the pressure of fluid in said brake cylinder by effecting a flow of fluid being supplied to said brake cylinder to said service volume reservoir in amounts varying inversely to the load carried by the vehicle, an emergency volume reservoir, and means operative as a result of an emergency reduction in the pressure of fluid in the brake pipe to establish a communication through which fluid under pressure flows from said service volume reservoir to said emergency volume reservoir.

14. A vehicle variable load fluid pressure brake, in combination, a brake pipe normally charged with fluid under pressure, an auxiliary reservoir, an emergency reservoir, a brake cylinder, a brake controlling valve device operative in response to an emergency reduction in the pressure of fluid in said brake pipe to connect the auxiliary and emergency reservoirs to the brake cylinder, a service volume reservoir, an emergency volume reservoir, a variable load valve mechanism, a passage connecting said mechanism to the volume reservoirs, said variable load valve mechanism being operative to vary the pressure of fluid in said brake cylinder according to variations in the weight of the lading carried by the vehicle by permitting fluid under pressure being supplied by the brake controlling valve device to said brake cylinder to flow to said passage in amounts varying inversely to the weight of the lading carried by the vehicle, and valve means interposed in said passage and operative in response to a subsequent increase the pressure of fluid in the brake pipe to effect a release of the brakes to close communication between said passage and said emergency volume reservoir and to vent fluid under pressure from the emergency volume reservoir.

15. A vehicle variable load fluid pressure brake, in combination, a brake pipe, an auxiliary reservoir, an emergency reservoir, all normally charged with fluid under pressure, a brake cylinder, a brake controlling valve device operative in response to a service reduction in the pressure of fluid in said brake pipe to admit fluid under pressure from said auxiliary reservoir to said brake cylinder and operative in response to an emergency reduction in the pressure of fluid in said brake pipe to admit fluid under pressure from the auxiliary and emergency reservoirs to the brake cylinder, a service volume reservoir, an emergency volume reservoir, a variable load valve mechanism interposed between said brake controlling valve and said service volume reservoir and operative to vary the pressure of fluid in said brake cylinder by permitting fluid under pressure supplied from the brake controlling valve device to the brake cylinder to flow to said service volume reservoir in amounts varying inversely to the load carried by the vehicle, said valve mechanism being adjustable in accordance with the weight of the load carried by the vehicle for operation according to variations in the pressure of fluid supplied to the brake cylinder to permit proportional amounts of fluid under pressure to flow to said service volume reservoir, and valve means subject to the pressure of fluid in the brake pipe and operative in response to an emergency reduction in the pressure of fluid in the brake pipe to connect said emergency volume reservoir to said service volume reservoir.

16. In a vehicle variable load fluid pressure brake equipment of the type comprising a brake pipe, an auxiliary reservoir, an emergency reservoir, a brake cylinder, and a brake controlling valve device operative to effect a service brake application by admitting fluid under pressure from said auxiliary reservoir to said brake cylinder and operative to effect an emergency brake application by admitting fluid under pressure from the auxiliary and the emergency reservoirs to the brake cylinder, in combination, a service volume reservoir, an emergency volume reservoir, a variable load valve mechanism operative to vary the pressure of fluid in said brake cylinder by admitting fluid supplied thereto to the volume reservoirs in amounts varying inversely to the load carried by the vehicle, said mechanism being adjustable in accordance with the weight of the load carried by the vehicle for operation according to variations in the pressure of fluid supplied to said brake cylinder to permit proportional amounts of fluid under pressure to flow to the volume reservoirs, and valve means subject to fluid under pressure in the brake pipe and normally closing communication between said variable load valve mechanism and said emergency volume reservoir, said means being operative as an incident to effecting an emergency application to connect said emergency volume reservoir to said variable load valve mechanism.

17. In a fluid pressure brake equipment, in combination, two fluid pressure supply sources, valve means operative to supply fluid under pressure from one of said fluid pressure supply sources to effect a service application of the brakes and operative to supply fluid under pressure from said two fluid pressure supply sources to effect an emergency application of the brakes, two volume reservoirs normally depleted of fluid under pressure and arranged for receiving fluid under pressure being supplied by the brake controlling valve device, valve means functioning in response to the pressure of fluid being supplied by the brake controlling valve device to establish communication through which fluid under pressure being supplied by the brake controlling valve device may flow to one of said volume reservoirs, and means normally isolating the other of said volume reservoirs from said one volume reservoir and operative as an incident to the effecting of an emergency application of the brakes for opening said other volume reservoir to said one volume reservoir.

18. In a vehicle variable load fluid pressure brake equipment, in combination, two fluid pressure supply sources, valve means operative to supply fluid under pressure from one of said fluid pressure supply sources to effect a service application of the brakes and operative to supply fluid under pressure from said two fluid pressure supply sources to effect an emergency application of the brakes, two volume reservoirs normally depleted of fluid under pressure and arranged for receiving fluid under pressure being supplied by said brake controlling valve device, valve means functioning in response to the pressure of fluid being supplied by the brake controlling valve device to establish a communication through which fluid under pressure being supplied by the brake controlling valve device may flow to one of said volume reservoirs, and means normally isolating the other of said volume reservoirs from said one volume reservoir and operative as an incident to the effecting of an emergency application of the brakes for opening said other volume reservoir to said one volume reservoir, said valve means being conditioned according to various weights of lading carried by the vehicle for operation to correspondingly vary the amount of fluid flowing to one or both of said volume reservoirs for any given amount of fluid under pressure supplied by the brake controlling valve device.

19. In a vehicle variable load fluid pressure brake equipment, a brake pipe normally charged with fluid under pressure, an auxiliary reservoir normally charged with fluid under pressure, an emergency reservoir normally charged with fluid under pressure, a brake cylinder, a brake controlling valve device operative in response to a service reduction in the pressure of fluid in the brake pipe for supplying fluid under pressure from the auxiliary reservoir to said brake cylinder and operative in response to an emergency reduction in the pressure of fluid in the brake pipe for supplying fluid under pressure from both the auxiliary and emergency reservoirs to the brake cylinder, a first volume reservoir normally depleted of fluid under pressure and arranged to receive fluid under pressure being supplied to the brake cylinder by said brake controlling valve device, a second volume reservoir normally depleted of fluid under pressure, means operative in response to said emergency reduction in the pressure of fluid in the brake pipe for establishing a communication through which fluid under pressure being supplied by the brake controlling valve device may flow to said second volume reservoir, and valve means operative according to various weights of lading carried by the vehicle for variously measuring the amounts of fluid flowing to either said first volume reservoir or to both volume reservoirs.

20. In a vehicle variable load fluid pressure brake equipment, a brake pipe normally charged with fluid under pressure, an auxiliary reservoir normally charged with fluid under pressure, an emergency reservoir normally charged with fluid under pressure, a brake cylinder, a brake controlling valve device operative in response to a service reduction in the pressure of fluid in the brake pipe for supplying fluid under pressure from the auxiliary reservoir to said brake cylinder and operative in response to an emergency reduction in the pressure of fluid in the brake pipe for supplying fluid under pressure from both the auxiliary and emergency reservoirs to the brake cylinder, a first volume reservoir normally depleted of fluid under pressure and arranged to receive fluid under pressure being supplied to the brake cylinder by said brake controlling valve device, a second volume reservoir normally depleted of fluid under pressure, means operative in response to said emergency reduction in the pressure of fluid in the brake pipe for establishing a communication through which fluid under pressure being supplied by the brake controlling valve device may flow to said second volume reservoir, and valve means operative according to various weights of lading carried by the vehicle for variously measuring the amounts of fluid flowing to either said first volume reservoir or to both volume reservoirs, said valve means being subject to the opposing pressures of fluid in the brake cylinder and said first volume reservoir and operative upon an increase in the pressure of fluid in the first volume reservoir for controlling the amount of fluid under pressure flowing thereto.

21. In a vehicle variable load fluid pressure brake equipment, a brake pipe normally charged with fluid under pressure, an auxiliary reservoir normally charged with fluid under pressure, an emergency reservoir normally charged with fluid under pressure, a brake cylinder, a brake controlling valve device operative in response to a service reduction in the pressure of fluid in the brake pipe for supplying fluid under pressure from the auxiliary reservoir to said brake cylinder and operative in response to an emergency reduction in the pressure of fluid in the brake pipe for supplying fluid under pressure from both the auxiliary and emergency reservoirs to the brake cylinder, a first volume reservoir normally depleted of fluid under pressure and arranged to receive fluid under pressure being supplied to the brake cylinder by said brake controlling valve device, a second volume reservoir normally depleted of fluid under pressure, means operative in response to said emergency reduction in the pressure of fluid in the brake pipe for establishing a communication through which fluid under pressure being supplied by the brake controlling valve device may flow to said second volume reservoir, and valve means operative according to various weights of the lading carried by the vehicle for variously measuring the amounts of fluid flowing to either said first volume reservoir or to both volume reservoirs, said valve means being subject to the opposing pressures of fluid in the brake cylinder and said first volume reservoir and operative upon an increase in the pressure of fluid in the first volume reservoir for controlling the amount of fluid under pressure flowing thereto, and said means comprising means adjustable according to different weights of lading carried by the vehicle for conditioning the valve means for response to different pressures of fluid in said first volume reservoir.

22. The combination in a vehicle variable load brake equipment, of a brake pipe, an auxiliary reservoir, a brake cylinder, a brake controlling valve device operative upon a reduction in brake pipe pressure to establish communication through which fluid under pressure is supplied from said auxiliary reservoir to said brake cylinder to effect an application of the brakes, a volume reservoir, a variable load valve mechanism operative to vary the pressure of fluid supplied to said brake cylinder by permitting fluid under pressure being supplied to the brake cylinder to flow to said volume reservoir in amounts varying inversely to the load carried by the vehicle, said mechanism being adjustable in accordance with the weight of the load carried by the vehicle for operation according to variations in the pressure of fluid supplied to said brake cylinder to permit proportional amounts of fluid under pressure to flow to said volume reservoir, and valve means responsive to a predetermined decrease in the pressure of fluid in said auxiliary reservoir for closing said communication to limit the flow of fluid from the auxiliary reservoir to the brake cylinder.

23. In a fluid pressure brake, in combination, a reservoir normally charged with fluid under pressure, a brake controlling valve device operative to supply fluid under pressure from said reservoir to effect an application of the brakes, and valve means interposed between said reservoir and said brake controlling valve device and operative in response to a chosen reduction in the pressure of fluid in the reservoir and regardless of the rate of such reduction for cutting off the brake cylinder supply of fluid under pressure from the reservoir.

24. In a fluid pressure brake, in combination, a reservoir normally charged with fluid under pressure, a brake controlling valve device operative to supply fluid under pressure from said reservoir to effect an application of the brakes, and valve means interposed between said reservoir and said brake controlling valve device and operative in response to a predetermined reduction in the pressure of fluid in the reservoir for cutting off the brake cylinder supply of fluid under pressure from the reservoir, said valve means being automatically conditioned, according to any one of different pressures of fluid to which the reservoir may be charged, for operation in response to said predetermined reduction in the reservoir pressure below the particular pressure of fluid carried in the reservoir.

25. In a fluid pressure brake equipment, in combination, a brake pipe normally charged with fluid under pressure, an auxiliary reservoir normally charged with fluid from the brake pipe and to the same pressure, a brake cylinder, a service volume reservoir normally at atmospheric pressure and in open communication with said brake cylinder, a brake controlling valve device operative in response to a full service reduction in brake pipe pressure to supply fluid under pressure from said auxiliary reservoir to said brake cylinder and service volume reservoir, the pressure of fluid in the auxiliary reservoir being reduced by such supply to a pressure substantially equal to the reduced brake pipe pressure, and valve means operative in response to the reduction in auxiliary reservoir pressure for inhibiting any further supply of fluid from the auxiliary reservoir to the brake cylinder in the event of a further reduction in brake pipe pressure.

26. In a fluid pressure brake equipment, in combination, a brake pipe normally charged with fluid under pressure, an auxiliary reservoir charged with fluid to a pressure substantially equal to that of the fluid in the brake pipe, a brake cylinder, a brake controlling valve device subject to the opposing pressures of fluid in the brake pipe and auxiliary reservoir and operative in response to a full service reduction in brake pipe pressure to supply fluid under pressure from said auxiliary reservoir to the brake cylinder, a service volume reservoir into which fluid under pressure being supplied by the brake controlling valve device to the brake cylinder also flows, said brake controlling valve device being operative, when due to the flow of fluid to the brake cylinder and service volume reservoir, the auxiliary reservoir pressure is reduced to substantially the reduced brake pipe pressure, to cut-off the flow of fluid to the brake cylinder and service volume reservoir, and means responsive to the reduction in auxiliary reservoir pressure for inhibiting any further supply of fluid under pressure from the auxiliary reservoir to the brake cylinder in the event of a further reduction in brake pipe pressure.

27. In a fluid pressure brake equipment, in combination, a brake pipe normally charged with fluid under pressure, an auxiliary reservoir charged with fluid to a pressure substantially equal to that of the fluid in the brake pipe, a brake cylinder, a brake controlling valve device subject to the opposing pressures of fluid in the brake pipe and auxiliary reservoir and operative in response to a full service reduction in brake pipe pressure to supply fluid under pressure from said auxiliary reservoir to the brake cylinder, a service volume reservoir into which fluid under pressure being supplied by the brake controlling valve device to the brake cylinder also flows, said brake controlling valve device being operative, when due to the flow of fluid to the brake cylinder and service volume reservoir, the auxiliary reservoir pressure is reduced to substantially the reduced brake pipe pressure, to cut-off the flow of fluid to the brake cylinder and service volume reservoir, the combined volumes of the brake cylinder and service volume reservoir being such with relation to the volume of the auxiliary reservoir that the brake cylinder pressure attained by said reduction in brake pipe pressure will be lower than the pressure of fluid remaining in the auxiliary reservoir, and means responsive to the reduction in auxiliary reservoir pressure for inhibiting any further supply of fluid under pressure from the auxiliary reservoir to the brake cylinder in the event of a further reduction in brake pipe pressure.

28. In a fluid pressure brake equipment, in combination, a brake pipe normally charged with fluid under pressure, an auxiliary reservoir charged with fluid to a pressure substantially equal to that of the fluid in the brake pipe, a brake cylinder, a brake controlling valve device subject to the opposing pressures of fluid in the brake pipe and auxiliary reservoir and operative in response to a full service reduction in brake pipe pressure to supply fluid under pressure from said auxiliary reservoir to the brake cylinder, a service volume reservoir into which fluid under pressure being supplied by the brake controlling valve device to the brake cylinder also flows, said brake controlling valve device being operative, when due to the flow of fluid to the brake cylinder and service volume reservoir, the auxiliary reservoir pressure is reduced to substantially the reduced brake pipe pressure, to cut-off the flow of fluid to the brake cylinder and service volume reservoir, the combined volumes of the brake cylinder and service volume reservoir being such with relation to the volume of the auxiliary reservoir that the brake cylinder pressure attained by said reduction in brake pipe pressure will be lower than the pressure of fluid remaining in the auxiliary reservoir, means responsive to the reduction in auxiliary reservoir pressure for inhibiting any further supply of fluid under pressure from the auxiilary reservoir to the brake cylinder in the event of a further reduction in brake pipe pressure, and valve means operative according to the weight of the lading carried by the vehicle for measuring the amount of fluid under pressure flowing to said service volume reservoir.

EARLE S. COOK.